Nov. 18, 1947.  S. R. DU BRIE  2,431,111

WIND MOTOR

Filed Dec. 16, 1943

INVENTOR.
STANLEY R. DuBRIE
BY

Patented Nov. 18, 1947

2,431,111

UNITED STATES PATENT OFFICE 2,431,111

WIND MOTOR

Stanley R. Du Brie, Detroit, Mich.

Application December 16, 1943, Serial No. 514,569

2 Claims. (Cl. 170—13)

1

This invention relates to wind motors the object being to provide a new and improved apparatus actuatable by wind current to operate mechanism connected with a power output shaft.

The principal feature and object of the invention is to provide a power apparatus comprising a series of wind wheels each comprising a series of vanes and mounted to rotate on a common vertical axis and mechanism associated therewith whereby one or more than one of the wind wheels may be caused to do effective work as for instance to drive an electric generator or other apparatus as hereinafter described.

The arrangement of the vanes of the successive wheels is such that the vanes of an upper wind wheel of a series are out of vertical alignment with a lower wheel and thus, by use of two or more wheels in vertical alignment, when the vane of one wheel is passing out of influence by the wind stream, the vane of a succeeding wheel is in position to receive the full force of the wind. The result of such arrangement is that a constant torque is maintained on the shaft.

These and various other objects and features of the invention are hereinafter more fully described and claimed and the preferred form of wind motor embodying my invention is shown in the accompanying drawing in which—

Figure 1:
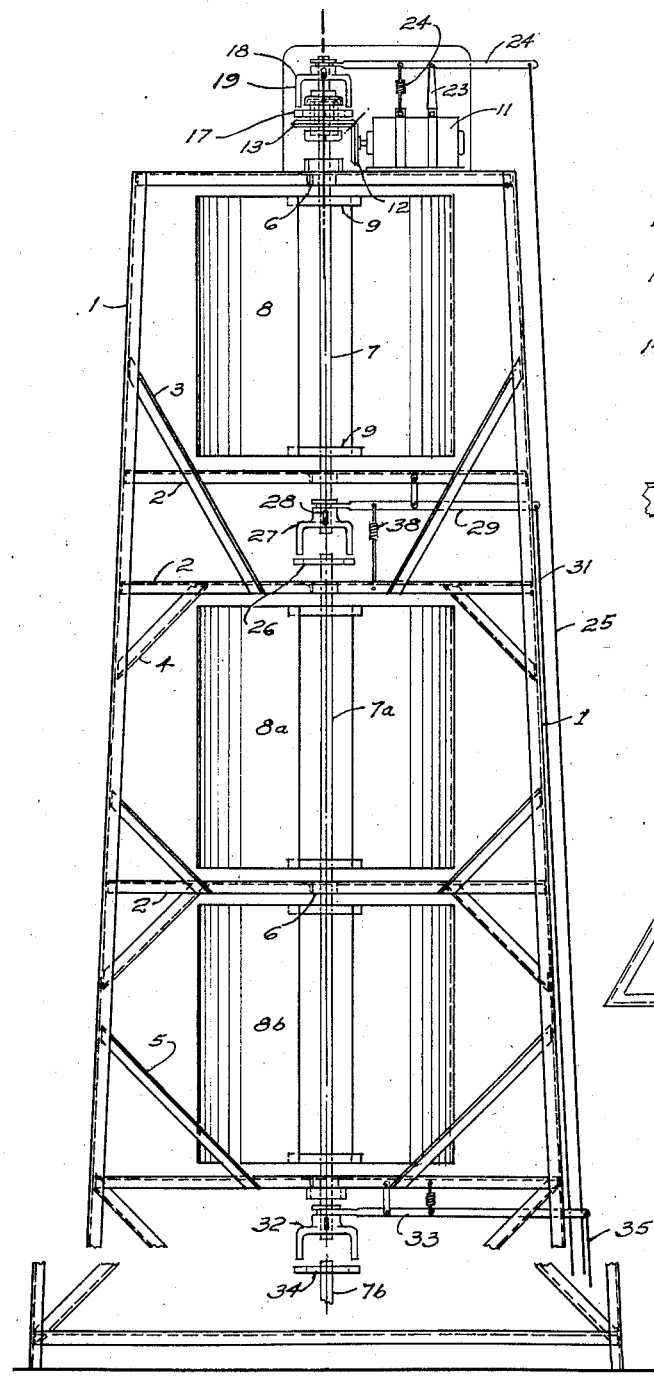
Fig. 1 is an elevation showing my improved wind motor.
Figure 3:
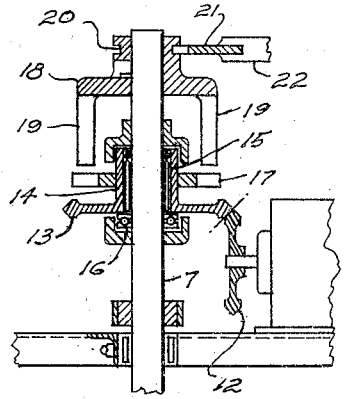
Fig. 3 is a vertical section on an enlarged scale having the generator driving mechanism.
Figure 2:
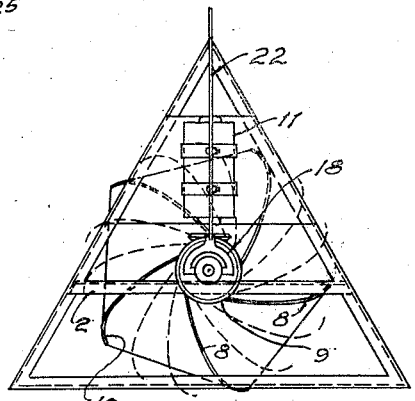
Fig. 2 is a plan view thereof.

The wind motor comprises a vertical framework 1 of a triangular form as will be understood from the plan view Fig. 2 and includes cross bars 2, 2, 2 vertically spaced substantially as shown and also includes brace members 3, 4, 5 of which there are a series. The cross bars 2 extend transversely of the frame as shown in Fig. 2 and these cross bars each support a bearing element 6 for the vertical shaft formed of two or more parts 7, 7a and 7b. The inner vertical edges of the vanes 8 of each wind wheel extend practically tangentially from the respective disc 9 and are attached to the shaft 7 and are curved at the free edges as indicated at 10. Therefore air striking a vane may flow out of the vane at its inner edge to strike the vane on the opposite side of the shaft. Thus the force of the air stream is applied not only to the vanes on the windward side but flows across and in a direction to impinge upon a blade on the leeward side of each of the wheels and, depending upon the

2 power output required, two or more than two wind wheels may be utilized.

In the drawing I have indicated an electric generator 11 mounted on the top of the framework and having a beveled gear 12 meshing with a beveled gear 13 having a hollow hub 14 which hub is provided with the vertical roller bearing 15 and which is also supported by the thrust bearing 16 on the shaft 7. The sleeve of the gear 13 has a notched plate 17 fixed thereto and on the shaft 7 is a clutch element 18 having forks 19 to engage in the notches in the plate 17. The clutch element 18 has a peripheral groove 20 in its hub in which the forked end 21 of a lever 22 rides.

The lever 22 is pivoted on the standard 23 mounted on the top of the main frame and a coiled spring 24 tends to move the lever on its pivot to thereby move the forked arms downwardly into the slots provided therefor in the member 17 whereby the wind wheels may rotate the shaft 7 and drive the gear 12 of the generator. The notched member 17 is fixed to the hub of the gear 13 and by pulling on the cord 25 the operator at the ground line may turn the lever 22 on its pivot and thus withdraw the forks of the member 18 from the notched member 17 and thus disconnect the generator from operative relation with the shaft 7.

Under some conditions the upper wind wheel 8 may provide sufficient power for operation of the generator and thus it is desirable to disconnect the lower wheels 8a and 8b from operative relation with the shaft 7. For this purpose I provide a notched plate 26 on the upper end of the shaft section 7a and a forked member 27 slidable on the lower end of the shaft 7. The forked member 27 has a hub formed with a slot 28 through which a pin on the shaft section 7 projects thus permitting limited movement of the forked member on the shaft. The forked element 27 has a groove in which the forked end of the pivoted lever 29 engages and a spring element 30 tends to force the forked member 27 into the notches of the plate 26. The notches in the plate 26 are so positioned that when the fork 27 engages therein the vanes of the upper wheel 8 are out of vertical alignment with the vanes of either of the other wheels as will be understood from Fig. 2. The member 29 has a cord 31 attached thereto and extending to the ground surface whereby the operator by pulling on the cord may disengage the forked member 27 from the notched plate 26 thus leaving the upper wind wheel 28 operating the generator. This is particularly serviceable under a high wind condition wherein one of the wind wheels may provide ample power for driving the generator or other apparatus not here shown.

The shaft 7a may be connected opposite its axis with other apparatus not here shown, but it is obvious that the wind wheels 8a and 8b could be operatively connected with a pumping apparatus, for instance, and thus with the clutch member 27 disengaged from the plate 26, as shown, the upper wheel may drive the generator and the lower wheels 8a and 8b could drive other apparatus. It is also pointed out that the member 19 may be disengaged from the notched plate 17 at the upper end of the shaft section 7 and with the clutch members 26 and 27 in engagement all three of the wind wheels may apply force to rotate the shaft 7a to operate mechanism operatively connected therewith.

The major feature of this invention resides in the positioning of the several wind wheels 8, 8a and 8b with the vanes of any one wheel out of vertical alignment with the vanes of either of the others and thus, as the wind force on one blade begins to loose its effect through revolution of the wheel, a second blade of a succeeding wheel is brought to position to receive the full force of the wind and thereafter a blade of the lower wheel is brought to position to receive the full force of the wind as the blade of the second wheel moves about the axis. There is thus a substantially constant pressure applied to the shaft to cause a substantially constant speed of rotation thereof.

A third shaft element 7b is vertically aligned with the shaft sections 7a and 7 and may be connected with apparatus, not here shown, for driving the same. The clutch member 32 is provided between the shaft sections 7a and 7b operable by a lever 33 to engage the companion member 34 and each of the levers 22, 29 and 33 are spring actuated to cause the respective members 19, 27 or 32 to assume operative relation with the companion members 17, 26 and 34.

The levers may be released by the respective cords 25 for the upper clutch, 31 for the intermediate clutch and 35 for the lower clutch. When a clutch has been disengaged by pulling on the respective cord, the cord may be secured in fixed position by means not here shown to prevent operation of the respective clutch levers.

It is to be observed that if the clutch 18 is in engagement with its counterpart 17, the generator may be driven by the upper wind motor 8 only and by releasing the cord 31 the generator may be driven by the three wind motors 8, 8a and 8b or the clutch member for the wind motor 8 and the wind motor 8a may be disengaged and the lower clutch member 32 engaged with its counterpart 34 so that the two wind motors 8a and 8b may be applied to rotate the shaft 7b to operate a mechanism while the upper wind motor may continue to operate the generator. By this arrangement one of the wind motors may be generating an electric current while the other wind motors may be operating mechanisms connected with the shaft 7b.

The arrangement of wind motors and clutches as described provide for a variable power output as occasion may demand or all three of the wind motors may be applied to drive the generator or to drive apparatus connected with the shaft 7b.

The arrangement of wind motors further provides a means of compensating for light or heavy wind currents as more of the wind motors may be utilized under comparatively low wind pressure and less number of wind motors may be utilized under higher wind pressure.

The wind motor as herein described is therefore adapted for operation under varying wind pressures without relation to the direction of wind flow and provides a power apparatus that may be readily adjusted to provide the desired power output.

It is believed evident from the foregoing description that the apparatus described involves a new and serviceable arrangement of parts providing a low cost power apparatus that may be applied to operate various types of mechanisms by a suitable connection between the shafts and the mechanism and that the various features and objects of the invention are attained by the character and arrangement of parts as described.

It is further pointed out that various changes in the arrangement and relationship of parts may be made without departing from the spirit and scope of the invention as set forth in the appended claims.

Having thus fully described my invention, its utility and mode of operation, what I claim and desire to secure by Letters Patent of the United States is—

1. A wind motor comprising a framework, a vertical shaft mounted for rotation therein, a pair of wind wheels thereon in vertical alignment, said wind wheels each having blades of sheet form substantially as shown positioned in a vertical plane, and a central vertical shaft formed of two longitudinally aligned parts, the inner edge of each blade being parallel with and spaced from the shaft, a clutch for connecting or disconnecting the shaft parts, said clutch consisting of a part fixed to one shaft part, and a companion part movable on the other shaft part alignable for cooperative relation with the said first shaft part only when the blades of one wheel are out of vertical alignment with the respective blades of the other wheel and means for connecting or disconnecting one or more of the wheels relative to the shaft thereby adapting the same for operation under low or high pressure wind currents.

2. A wind motor comprising a framework, a vertical shaft rotatably supported therein, a series of wind wheels thereon in vertical alignment, said wind wheels each having blades of sheet form substantially as shown positioned in a vertical plane, and a central vertical shaft formed of two longitudinally aligned parts, the inner edge of each blade being parallel with and spaced from the shaft, a clutch for connecting or disconnecting the shaft parts, said clutch consisting of a part fixed to one shaft part, and a companion part movable on the other shaft part alignable for cooperative relation with the said first shaft part only when the blades of one wheel are out of vertical alignment with the respective blades of the other wheel and means for connecting or disconnecting one or more of the wheels relative to the shaft thereby adapting the same for operation under high or low pressure wind currents, and apparatus actuatable by rotation of the shaft for driving the same in the performance of work.

STANLEY R. DU BRIE.

(References on following page)

REFERENCES CITED

The following references are of record in the file of this patent:

UNITED STATES PATENTS

| Number | Name | Date |
|---|---|---|
| 1,027,501 | Pearson | May 28, 1912 |
| 1,367,766 | Bozied | Feb. 8, 1921 |
| 1,770,328 | Titterington | July 8, 1930 |
| 1,441,774 | Adams | Jan. 9, 1923 |
| 1,654,165 | Felt | Dec. 27, 1927 |
| 1,963,912 | Honnef | June 19, 1934 |

FOREIGN PATENTS

| Number | Country | Date |
|---|---|---|
| 631,431 | France | Dec. 20, 1927 |